United States Patent
Lee et al.

(10) Patent No.: US 9,600,105 B2
(45) Date of Patent: Mar. 21, 2017

(54) TOUCH PANEL DEVICE AND METHOD FOR MANUFACTURING THE SAME

(71) Applicant: TPK Touch Solutions (Xiamen) Inc., Xiamen (CN)

(72) Inventors: Yuh-Wen Lee, Hsinchu (TW); Keming Ruan, Ningde (CN); Ho-Hsun Chi, Hsinchu (TW); Fengming Lin, Fuzhou (CN); Xianbin Xu, Xiamen (CN); Chuandai Tang, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 117 days.

(21) Appl. No.: 14/181,715

(22) Filed: Feb. 16, 2014

(65) Prior Publication Data
US 2014/0232957 A1    Aug. 21, 2014

(30) Foreign Application Priority Data
Feb. 17, 2013   (CN) .......................... 2013 1 0051706

(51) Int. Cl.
| | | |
|---|---|---|
| *G02F 1/1335* | (2006.01) | |
| *G06F 3/041* | (2006.01) | |
| *G06F 3/044* | (2006.01) | |

(52) U.S. Cl.
CPC .............. *G06F 3/041* (2013.01); *G06F 3/044* (2013.01)

(58) Field of Classification Search
CPC .................................. G06F 3/041; G06F 3/044
USPC .......................................................... 349/12
See application file for complete search history.

(56) References Cited

U.S. PATENT DOCUMENTS

| 8,730,415 B2 * | 5/2014 | Omote | ..................... G06F 3/044 345/173 |
| 2013/0301192 A1 * | 11/2013 | Tang | ....................... G06F 3/044 361/679.01 |

FOREIGN PATENT DOCUMENTS

| CN | 202404553 | 8/2012 |
| CN | 202422064 | 9/2012 |
| CN | 203149519 | 8/2013 |
| KR | 101144702 | 5/2012 |
| TW | 437991 | 9/2012 |

* cited by examiner

*Primary Examiner* — Charles Chang
(74) *Attorney, Agent, or Firm* — Cooper Legal Group, LLC (57) ABSTRACT

A touch panel device is provided, having a cover plate, a first mask layer, a signal trace layer and a second mask layer. The cover plate has a visible area and a shield area at a side of the visible area. The shield area is divided into first, second area, third areas sequentially from the visible area to an edge of the shield area. The first mask layer disposed in the first and second areas of the shield area over a surface of the cover plate, wherein the first mask layer has a flat surface. The signal trace layer is disposed in the first area of the shield area over the flat surface. The second mask layer is at least disposed in the third area near the edge of the cover plate. A viscosity of the second mask layer is larger than a viscosity of the first mask layer.

20 Claims, 11 Drawing Sheets

TOUCH PANEL DEVICE AND METHOD FOR MANUFACTURING THE SAME

BACKGROUND OF THE INVENTION

The present invention claims the priority of China Patent Application No. 201310051706.6 filed on Feb. 17, 2013, which is incorporated by reference in the present application in its entirety.

FIELD OF THE INVENTION

The technical field relates to a touch control technique, and especially to a touch panel device and method for manufacturing the same.

DESCRIPTION OF THE RELATED ART

Touch panel devices are widely used in all kinds of electronic products, such as cell phones, personal data assistants (PDA), and tablet personal computers. In recent years, development of thinned touch panels is desired.

Figure 1:
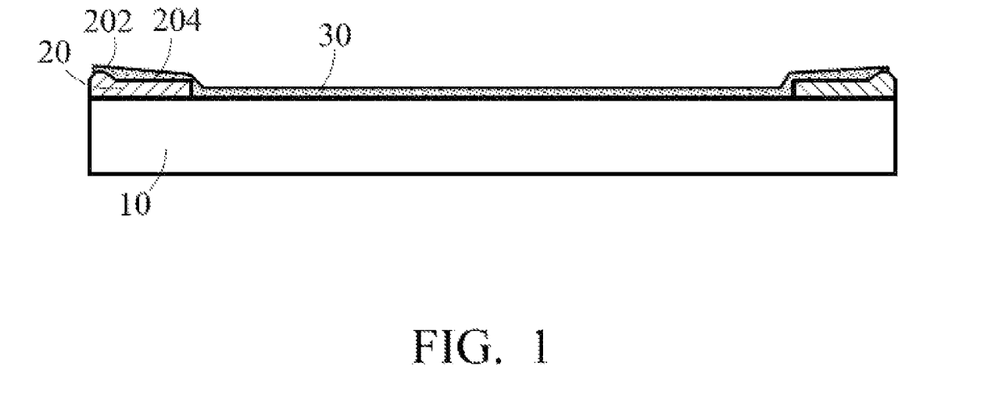
FIG. 1 illustrates a cross-sectional representation of a thinned touch panel device.

FIG. 1 illustrates a cross-sectional representation of a thinned touch panel device. The thinned touch panel device includes a protective cover 10, a mask layer 20, and a touch unit 30. The mask layer 20 and the touch unit 30 are formed directly onto a side of the protective cover 10, and a user can control or input signals from the other side of the protective cover 10 by touch.

In the thinned touch panel device, the mask layer 20 is made of a masking material with a low viscosity. For example, the viscosity may be in a range from about 3 cps to about 50 cps. As shown in FIG. 1, the surface of the mask layer 20 is uneven and includes a flat surface 204 and a raised surface 202. When the low viscosity masking material is coated on the protective cover 10, the masking material will first aggregate at an edge of the protective cover 10 to form the raised surface 202 due to the surface tension. Therefore, after the masking material is cured to form the mask layer 20, the resulting mask layer 20 will have an uneven surface.

The performance of the touch unit will be affected by the uneven surface of the mask layer 20, and the yield of manufacturing the thinned touch panel device decreases.

BRIEF SUMMARY OF THE INVENTION

In some embodiments, a first mask layer with a low viscosity and a second mask layer with a high viscosity are formed in a touch panel device. The high viscosity of the second mask layer enables the formation of a flat surface even at an edge of a protective cover plate. Therefore, the performance of the touch unit will not be affected by the surface of the mask layer, and the yield of manufacturing the touch panel device is improved.

In some embodiments, a touch panel device includes a cover plate having a visible area and a shield area at a side of the visible area, wherein the shield area is divided into a first area, a second area, and a third area sequentially from the visible area to an edge of the shield area; a first mask layer disposed in the first area and the second area of the shield area over a surface of the cover plate, wherein the first mask layer has a flat surface; a signal trace layer disposed in the first area of the shield area over the flat surface of the first mask layer; and a second mask layer at least disposed in the third area near the edge of the cover plate, wherein the second mask layer has a viscosity greater than that of the first mask layer.

In some embodiments, a method for manufacturing a touch panel device includes providing a cover plate, wherein the cover plate has a visible area and a shield area at a side of the visible area, and the shield area is divided into a first area, a second area, and a third area sequentially from the visible area to an edge of the shield area; forming a first mask layer in the first area and the second area of the shield area over a surface of the cover plate, wherein the first mask layer has a flat surface; forming a signal trace layer in the first area of the shield area over the flat surface of the first mask layer; and forming a second mask layer at least in the third area near the edge of the cover plate, wherein a viscosity of the second mask layer is larger than a viscosity of the first mask layer.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The making and using of the embodiments of the disclosure are discussed in detail below. It should be appreciated, however, that the embodiments can be embodied in a wide variety of specific contexts. The specific embodiments discussed are merely illustrative, and do not limit the scope of the disclosure.

It should be understood that the following disclosure provides many different embodiments, or examples, for implementing different features of the disclosure. Specific examples of components and arrangements are described below to simplify the present disclosure. These are, of course, merely examples and are not intended to be limiting. Moreover, the performance of a first process before a second process in the description that follows may include embodiments in which the second process is performed immediately after the first process, and may also include embodiments in which additional processes may be performed between the first and second processes. Various features may be arbitrarily drawn in different scales for the sake of simplicity and clarity. Furthermore, the formation of a first feature over or on a second feature in the description that follows include embodiments in which the first and second features are formed in direct contact, and may also include embodiments in which additional features may be formed between the first and second features, such that the first and second features may not be in direct contact.

Some variations of the embodiments are described. Throughout the various views and illustrative embodiments, like reference numbers are used to designate like elements.

Figure 2A:
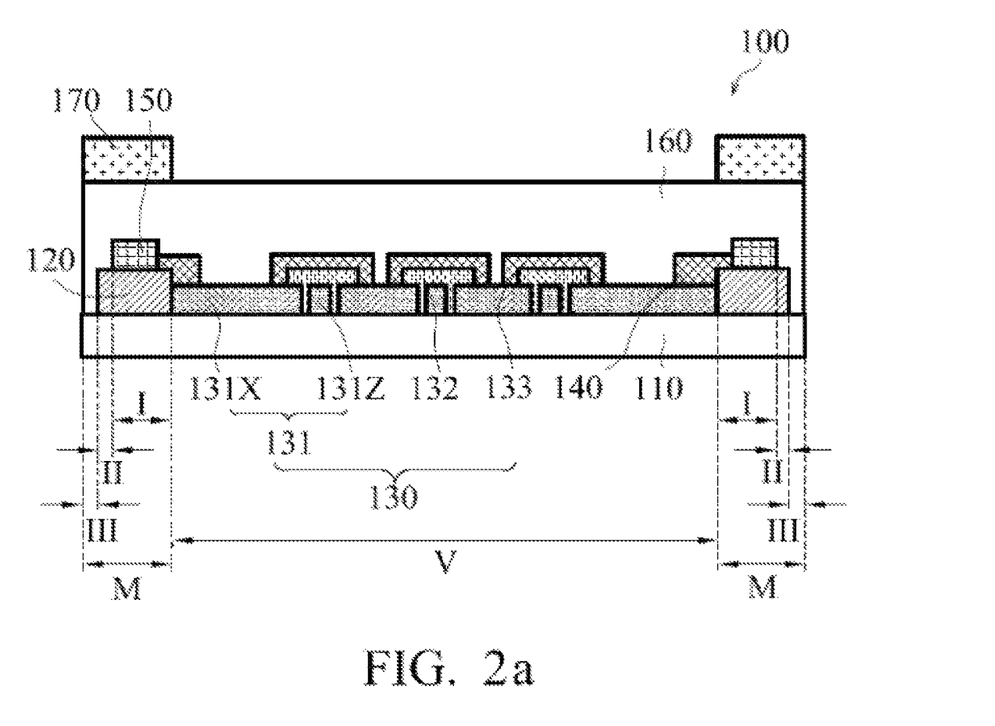
FIG. 2a illustrates a cross-sectional representation of a touch panel device in accordance with some embodiments.
Figure 2B:
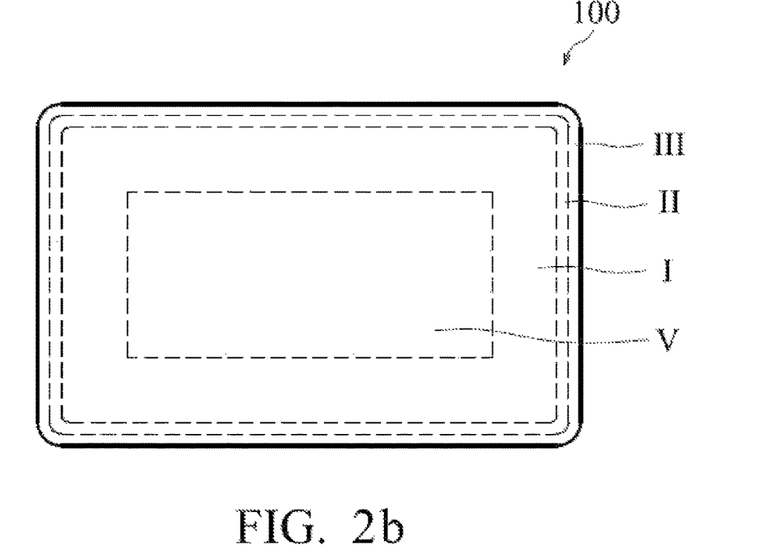
FIG. 2b illustrates a top view representation of a touch panel device in accordance with some embodiments.

FIG. 2a illustrates a cross-sectional representation of a touch panel device 100 in accordance with one embodiment. FIG. 2b illustrates a top view representation of a cover plate 110 shown in FIG. 2a in accordance with one embodiment. The touch panel device 100 includes the cover plate 110, a first mask layer 120, a signal trace layer 150, and a second mask layer 170. The cover plate 110 includes a visible area V and a shield area M at a side of the visible area V. From the visible area V to an edge of the shield area M, the shield area M is sequentially divided into a first area I, a second area II, and a third area III. The first mask layer 120 is disposed in the first area I and the second area II over the cover plate 110. The first mask layer 120 has a flat surface. The signal trace layer 150 is disposed in the first area I and on the flat surface of the first mask layer 120. The second mask layer 170 is disposed at least in the third area III adjacent to an edge of the cover plate 110. The viscosity of the second mask layer 170 is greater than the viscosity of the first mask layer 120.

As shown in FIG. 2a, the touch panel device 100 further includes a sensing layer 130 electrically connected to the signal trace layer 150. The sensing layer 130 is disposed in the visible area V over the cover plate 110.

In the present embodiment, the touch panel device 100 further includes a conductive portion 140. The conductive portion 140 is configured to electrically connect the sensing layer 130 and the signal trace layer 150. In some other embodiments, the sensing layer 130 is electrically connected to the signal trace layer 150 directly, and the conductive portion 140 is not required in such a touch panel device.

In the present embodiment, the touch panel device 100 further includes a protection layer 160. In the third area III, a first side of the protection layer 160 is disposed on the cover plate 110. In the second area II, the first side of the protection layer 160 is disposed on the flat surface of the first mask layer 120. In the first area I, the first side of the protection layer 160 is disposed on the signal trace layer 150. A second side of the protection layer supports the second mask layer 170.

In one embodiment, the color of the first mask layer 120 is the same as the color of the second mask layer 170. In another embodiment, the color of the first mask layer 120 is different from the color of the second mask layer 170.

Further referring to FIGS. 2a and 2b, the details of the disclosure are described below.

In the present embodiment, the shield area M further surrounds the visible area V. In addition, the first area I of the shield area M surrounds the visible area V. The second area II of the shield area M surrounds the first area I. The third area III of the shield area M surrounds the second area II. However, it should be noted that the shapes of the first area I, the second area II, and the third area III are not limited to the shapes shown in FIG. 2b.

In one embodiment, the width of the second area II is in a range from about 1.5 mm to about 3.5 mm. The width of the third area III is in a range from about 0.25 mm to about 0.5 mm. However, it should be noted that the widths of the first area I, the second area II, and the third area III may be adjusted as their applications and are not intended to be limiting.

The first mask layer 120 disposed in the first area I and the second area II over the cover plate 110 has a flat surface. Compared to the uneven surface (e.g. an obvious and sudden change in height) at the edge of the mask layer described previously, the mask layer 120 has a flat surface. However, it should be noted that the mask layer 120 may not necessarily to have the same thickness throughout the whole horizontal surface as shown in FIG. 2a. The height of the mask layer 120 may be flat, but it may also be gradually changed. For example, when the conductive portion 140 formed over the first mask layer 120 has a stepped portion, cracking tends to be formed at the stepped portion. Therefore, the first mask layer 120 may have a curve and smooth surface at the portion where the conductive portion 140 is going to be formed, such that the formation of cracks in the conductive portion 140 may be prevented.

In the present embodiment, the first mask layer 120 has a morphing pattern in the second area II. FIGS. 4a to 4g illustrate the morphing patterns which may be used in the first mask layer 120. As shown in FIGS. 4a to 4g, the morphing pattern of the first mask layer 120 in the second area II may have various shapes and forms. In some embodiments, the morphing pattern includes a plurality of identical or different shapes, symbols, letters, numbers, or combinations thereof. In some embodiments, the morphing pattern includes a plurality of holes aligned in an array. In some embodiments, the morphing pattern includes a plurality of triangles, quadrangles, circles, or combinations thereof.

Figure 3:
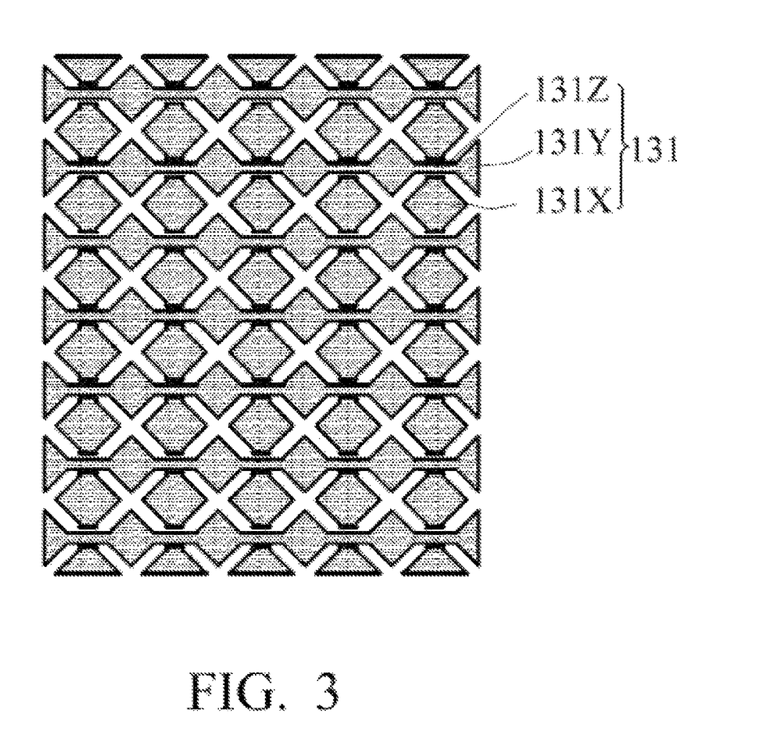
FIG. 3 illustrates a top view presentation of an electrode portion in accordance with some embodiments.
Figure 4A:
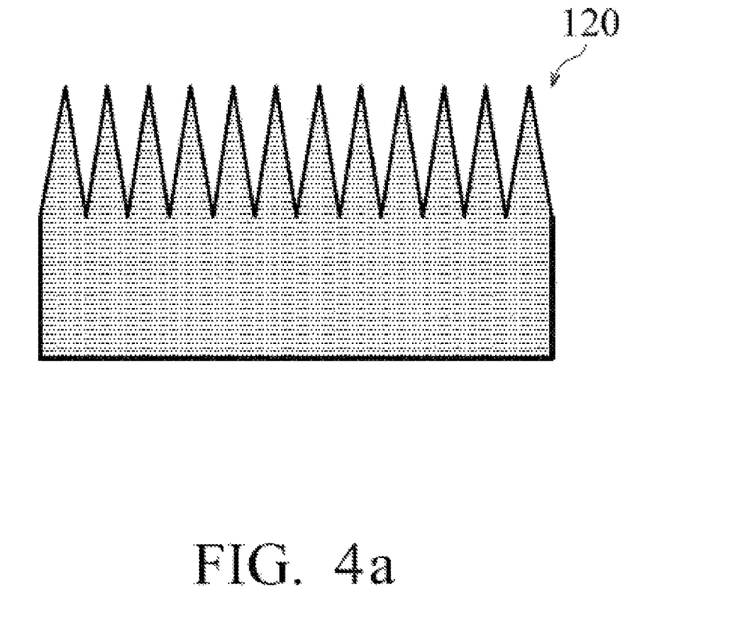
FIGS. 4a to 4g illustrate top view presentations of a morphing pattern in accordance with some embodiments.
Figure 4B:
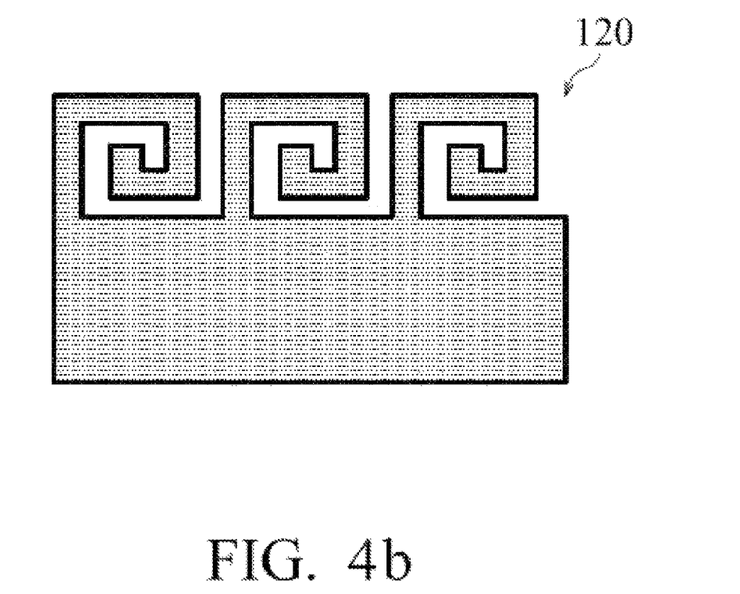
Figure 4C:
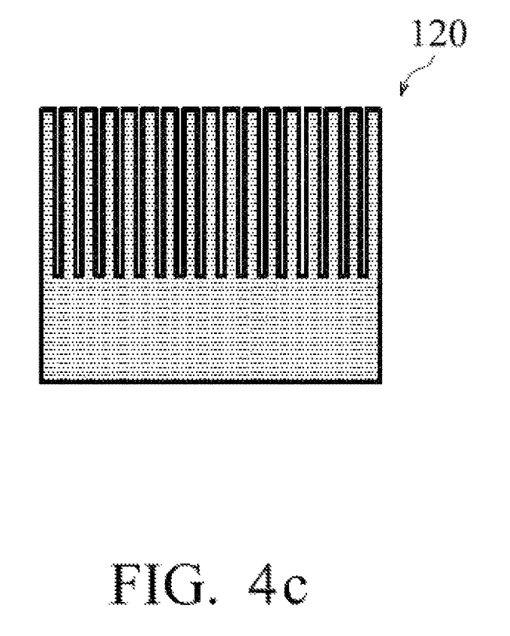
Figure 4D:
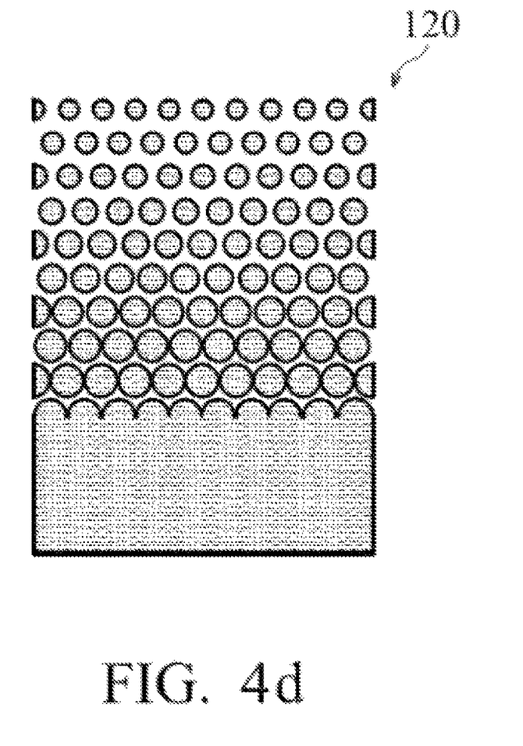
Figure 4E:
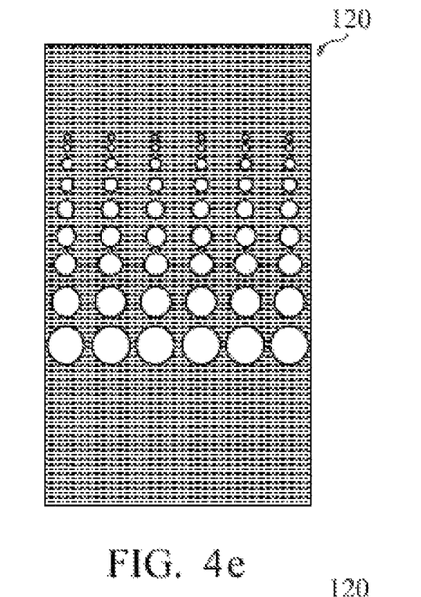
Figure 4F:
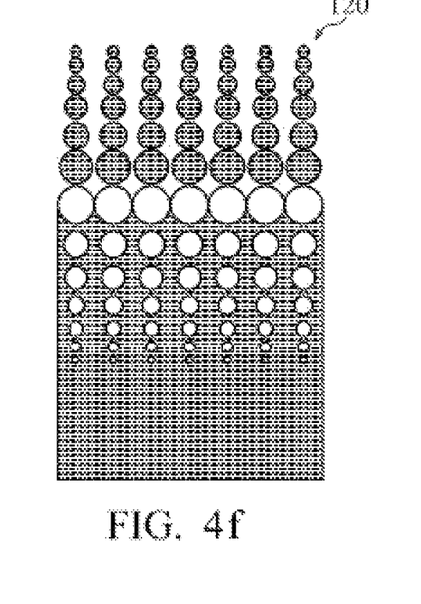
Figure 4G:
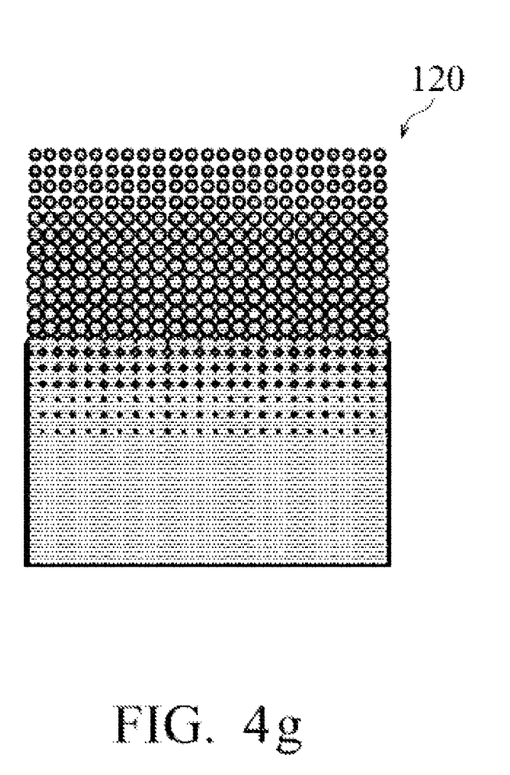

In the present embodiment, the sensing layer 130 includes an electrode portion 131, a plurality of insulating portions 132, and a plurality of cross-linking portions 133, as shown in FIG. 2a. FIG. 3 illustrates a top view presentation of the electrode portion 131 in accordance with some embodiments. The electrode portion 131 includes a plurality of first electrodes 131X aligned in row, a plurality of second electrodes 131Y aligned in column, and a plurality of connection portions 131Z connecting the second electrodes 131Y adjacent to each other. The cross-linking portions 133 are configured to connect the first electrodes 131X adjacent to each other in the same row. The insulating portions 132 are disposed between the connection portions 131Z and the cross-linking portions 133 to electrically insulate the connection portions 131Z and the cross-linking portions 133.

It should be noted that although different amounts of first electrodes 131X are shown in FIG. 1 and FIG. 3, they are only used as examples for better understanding the disclosure. The number and type of the first electrodes 131X are not intended to be limiting. In addition, the shapes of the first electrodes 131X and the second electrodes 131Y are not limited to the quadrangle or triangle shown in FIG. 3. The first electrodes 131X and the second electrodes 131Y may be in other shapes. Furthermore, the sensing layer 130 shown in FIG. 2a is used as an example, and the shape and pattern of the sensing layer is not intended to be limiting.

In some embodiments, the touch panel device 100 further includes conductive portions 140 to electrically connect the signal trace layer 150 and the first electrodes 131X. The conductive portions 140 may be formed in the same process which is used to form the cross-linking portions 133 using the same material. In other words, the conductive portions 140 and the cross-linking portions 133 may be formed integrally. However, the conductive portions 140 and the cross-linking portions 133 may also be formed by different materials. In another embodiment, the signal trace layer 150 electrically connects to the first electrodes 131X directly.

The signal trace layer 150 is located in the first area I and is disposed on the flat surface of the first mask layer 120. The signal trace layer 150 electrically connects to the sensing layer 130, and the electrical variation sensed by the first electrodes 131X can be transferred to a signal processer (not shown) by the signal trace layer 150. In addition, the electrical variation sensed by the second electrodes 131Y aligned in column may transferred by another signal trace layer (not shown). It should be noted that the signal trace layer 150 and the conductive portions 140 may only be formed at one side of the first mask layer 120 (e.g. single-ended trace). FIG. 1 illustrates the touch panel device with a double-ended trace. The signal trace layer 150 used to connect the same line may be connected to a signal processer (not shown) in a parallel connection. When the size of the touch panel device is large, signal attenuation may be reduced by connecting by the double-ended trace.

In one embodiment, the second mask layer 170 is formed only in the third area III being close to the edge of the cover plate 110.

In one embodiment, the second mask layer 170 is further formed in the second area II. That is, the second mask layer 170 is formed in the second area II and in the third area III.

In a preferred embodiment, the second mask layer 170 is further disposed in the second area II and in the first area I, as shown in FIG. 2a. That is, the second mask layer 170 extends from the first area I of the shield area M to the second area II and the third area III, such that the second mask layer 170 covers the whole shield area M.

The second mask layer 170 is formed over the signal trace layer 150 in the shield area M, and therefore the performance of light blocking is improved. In addition, since the first mask layer 120 is only disposed in the first area I and the second area II of the shield area M and does not extend into the third area III, no uneven portion (as shown in FIG. 1) will be formed at the edge of the cover plate 110. Therefore, the performance of the touch panel device will not be affected by the physical problems such as the uneven top surface.

When the first mask layer 120 and the second mask layer 170 are formed by different materials in different processes, color differences between the first mask layer 120 and the second mask layer 170 may be observed. Therefore, in some embodiments of the disclosure, the first mask layer 120 has a morphing pattern, such that the edge of the overlapping area of the first mask layer 120 and the second mask layer 170 has an intermediate (or buffering) area. The morphing pattern makes the color difference between the first mask layer 120 and the second mask layer 170 more difficult to observe by human eyes. In addition, the ability to block light may also be improved.

Furthermore, when the color of the first mask layer 120 and the color of the second mask layer 170 are different, the shield area M in the touch panel device 100 can have various colors and patterns. Therefore, the need for having a variety of colors and patterns in the shield area M of the touch panel device 100 is fulfilled.

The details of the elements in the touch panel device 100 are described below.

The cover plate 110 may be made of a transparent insulating material, such as glass or plastic materials. An example of the plastic material is poly(ethylene terephthalate). The cover plate 110 may be a rigid substrate or a flexible substrate. The cover plate 110 may be flat, curved, or a combination thereof. More specifically, the cover plate 110 may be a 2.5 D glass.

The first mask layer 120 may be substantially made of a light resisting material. The light resisting material may include a resin, a dye, a light-sensing agent, and a solvent. The viscosity of the first masking material layer 120 may be less than 150 cps. In some embodiments, the viscosity of the first masking material layer 120 is in a range from 3 cps to 50 cps. In some embodiments, the viscosity of the first masking material layer 120 is in a range from 60 cps to 100 cps. In a preferred embodiment, the first mask layer 120 is made of a black photoresist material, and the viscosity of the black photoresist material is in a range from 3 cps to 50 cps.

The electrodes portion 131 may be made of a transparent conductive material, such as silver nano-wire, carbon nano-tube (CNT), graphene, indium tin oxide (ITO), or aluminium zinc oxide (AZO). In one embodiment, the electrode portion 131 is an ITO layer formed at high temperature, such as between 300° C. and 350° C. The ITO layer formed at high temperature has a better transparency.

The cross-linking portions 133 may be made of a metallic material, a transparent conductive material, or a combination thereof. The metallic material may be silver or gold. The transparent material may be ITO. Preferably, the conductive portions 140 and the cross-linking portions 133 are formed by the same transparent conductive material, such as ITO. Accordingly, the signal trace layer 150 will not directly connected to the sensing layer 130 and therefore will not be seen even if the signal trace layer 150 is made of a metal.

The insulating portions 132 may be made of an insulating material such as a photoresist. The photoresist may be formed by an exposure process and a developing process.

In one embodiment, the insulating portions 132 are made of an organic or an inorganic insulating material, such as polyimide, epoxy resin, or the like.

The signal trace layer 150 may be made of metallic materials such as silver or aluminum, transparent conductive materials such as ITO, or a combination thereof. Preferably, the signal trace layer 150 is made of a metallic material, which has a better electrical conductivity.

In one embodiment, the electrode portion 131 is made of ITO formed under 300° C. to 350° C., and the cross-linking portions 132A are made of ITO formed under 20° C. to 30° C. The ITO formed at high temperature (e.g. in a range from 300° C. to 350° C.) and the ITO formed at low temperature (e.g. in a range from 20° C. to 30° C.) are patterned by different etchants during the photolithography processes. Therefore, the electrode portion 131 will not be damaged during the formation of the cross-linking portions 133.

The protection layer 160 may be made of a transparent insulating material, such as photoresist or silicon dioxide. In one embodiment, the protection layer 160 is made of a transparent photoresist material having a thickness in a range from 1500 nm to 2000 nm. In another embodiment, the protection layer 160 is made of silicon dioxide having a thickness in a range from 10 nm to 30 nm. The material and thickness of the protection layer 160 may be adjusted depending on the applications and are not intended to be limiting.

The viscosity of the second mask layer 170 may be different from the viscosity of the first mask layer 120. Preferably, the second mask layer 170 is made of a material with a higher viscosity (e.g. in a range from 3500 cps to 12000 cps, or more specifically, 4000 cps, 6000 cps, or 7500 cps), such that the second mask layer 170 can have a better flatness. The second mask layer 170 may be made of a color ink material (e.g. a black ink material) which includes a dye, a linking agent, and an auxiliary agent. The ink material may have a viscosity of over 10000 cps and may be formed by printing. Preferably, the color of the first mask layer 120 is similar to, or the same as, the color of the second mask layer 170.

It should be noted that some processes for manufacturing the touch panel device 100 may be performed at high temperature (e.g. the process for forming the electrode portion 131 made of ITO formed at high temperature, or some baking processes), and the sensing layer 130, the signal trace layer 150, or some other elements are formed by lithography processes. Therefore, when the first mask layer 120 is made of a photoresist material which can be patterned by a lithography process, the touch panel device 100 can be formed under the same or similar conditions (including the temperature, humidity, and vacuity) before the second mask layer 170 is formed. Accordingly, the efficiency of the manufacturing processes is improved.

Figure 5:
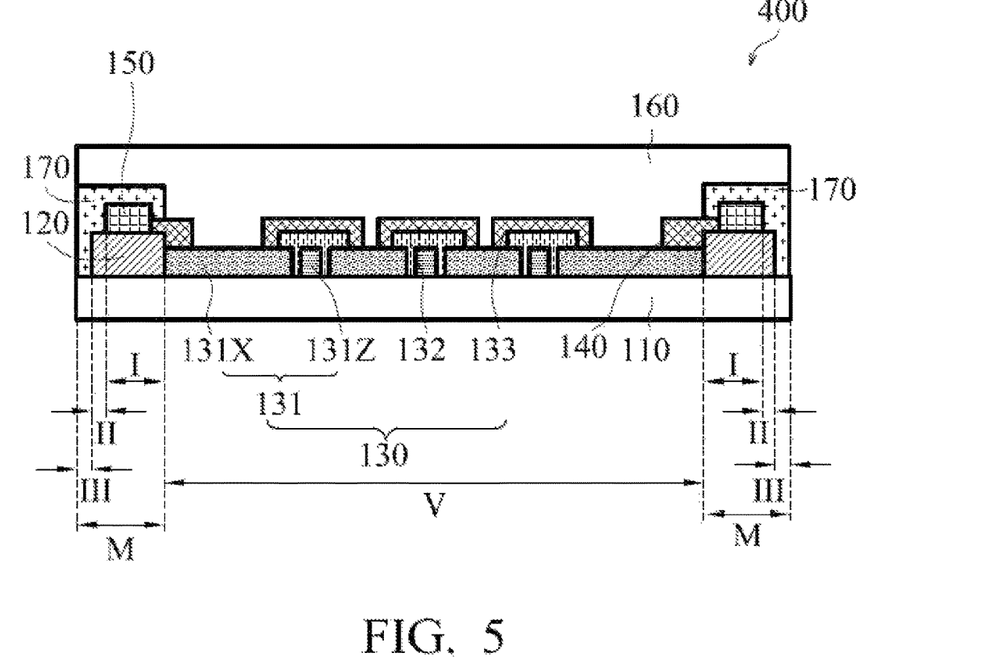
FIG. 5 illustrates a cross-sectional representation of a touch panel device in another embodiment.

FIG. 5 illustrates a cross-sectional representation of a touch panel device 400 in another embodiment. The touch panel device 400 shown in FIG. 5 is similar to that shown in FIG. 1 except for the second mask layer 170 being directly formed on the signal trace layer 150 and the protection layer 160 being formed afterwards. More specifically, in the present embodiment, the second mask layer 170 in the third area III is disposed on the cover plate 110. The second mask layer 170 in the second area II is disposed on the flat surface of the first mask layer 120. The second mask layer 170 in the first area I is disposed on the signal trace layer 150. The detailed features of the touch panel device 400 may be the same as the embodiment described above and are not repeated herein.

Figure 6:
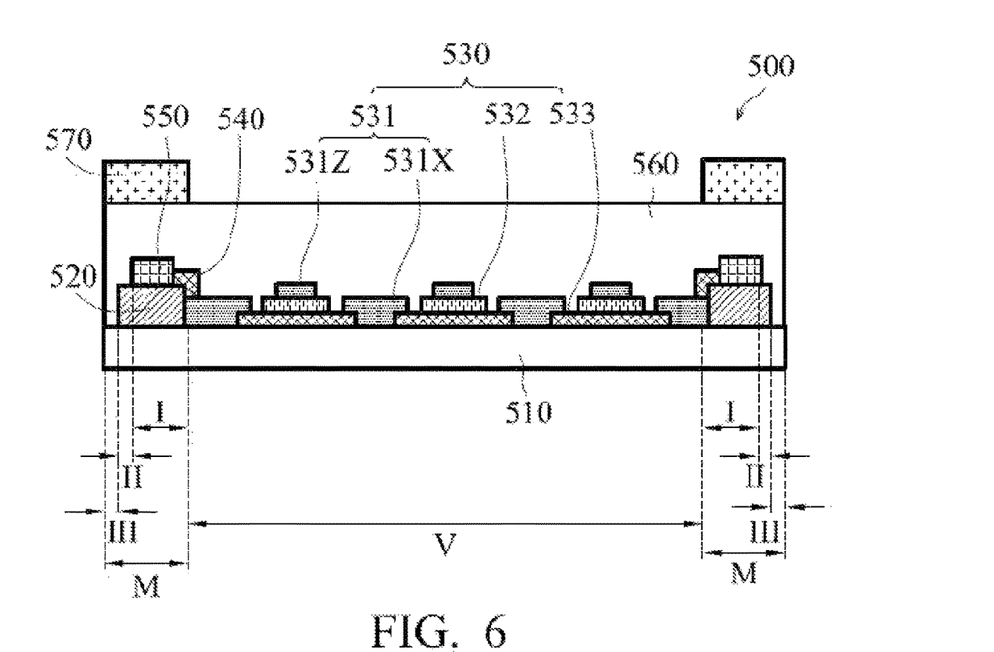
FIG. 6 illustrates a cross-sectional representation of a touch panel device in still another embodiment.

FIG. 6 illustrates a cross-sectional representation of a touch panel device 500 in still another embodiment. The touch panel device 500 is similar to the touch panel device 100 except for the structure of a sensing layer 530 being different from the sensing layer 130. Referring to FIG. 6, cross-linking portions 533 and insulating portions 532 are first formed in the visible area V, and then electrode portions 531 and conductive portions 540 are formed. Referring back to FIG. 1 and FIG. 3, the electrode portion 531 is similar to the electrode portions 131 shown in FIG. 1 and includes a plurality of first electrodes 531X aligned in row, a plurality of second electrodes (not shown in FIG. 6) aligned in column, and a plurality of connection portions 531Z connecting the adjacent second electrodes. A plurality of cross-linking portions 533 are configured to connect the first electrodes 531X adjacent to each other in the same row. The insulating portions 532 are disposed between the connection portions 531Z and the cross-linking portions 533 to electrically insulate the connection portions 531Z and the cross-linking portions 533.

The cross-linking portions 533 may be made of a metallic material, a transparent conductive material, or a combination thereof. The metallic material may be silver or gold. The transparent material may be ITO. In one embodiment, the cross-linking portions 533 are made of ITO formed at a high temperature, such as in a range from 300° C. to 350° C.

The sensing layer 530 may be made of a transparent conductive material, such as silver nano-wire, carbon nanotube (CNT), graphene, indium tin oxide (ITO), aluminium zinc oxide (AZO), or the like.

In one embodiment, when the cross-linking portions 533 are made of ITO formed at a high temperature (e.g. in a range from 300° C. to 350° C.), the electrode portion 531 may be made of ITO formed at a low temperature (e.g. in a range from 20° C. to 30° C.).

In the present embodiment, a signal trace layer 550 is electrically connected to first electrodes 531X through conductive portions 540, similar to that in FIG. 1. Preferably, the conductive portions 540 and the electrode portion 531 are made of the same material (e.g. ITO) and are formed at the same time.

A protection layer 560 is formed over the signal trace layer 550, and a second mask layer 570 is disposed over the protection layer 560. In addition, the second mask layer 570 is located in the mask area M. The detailed features of the touch panel device 500 may be similar to those of the touch panel device shown in FIG. 1 and are not repeated herein.

In another embodiment, a touch panel device may have a sensing layer structure similar to that in FIG. 6, while a second mask layer is directly formed on a signal trace layer and a protection layer is formed afterwards (similar to those in FIG. 5).

Figure 7:
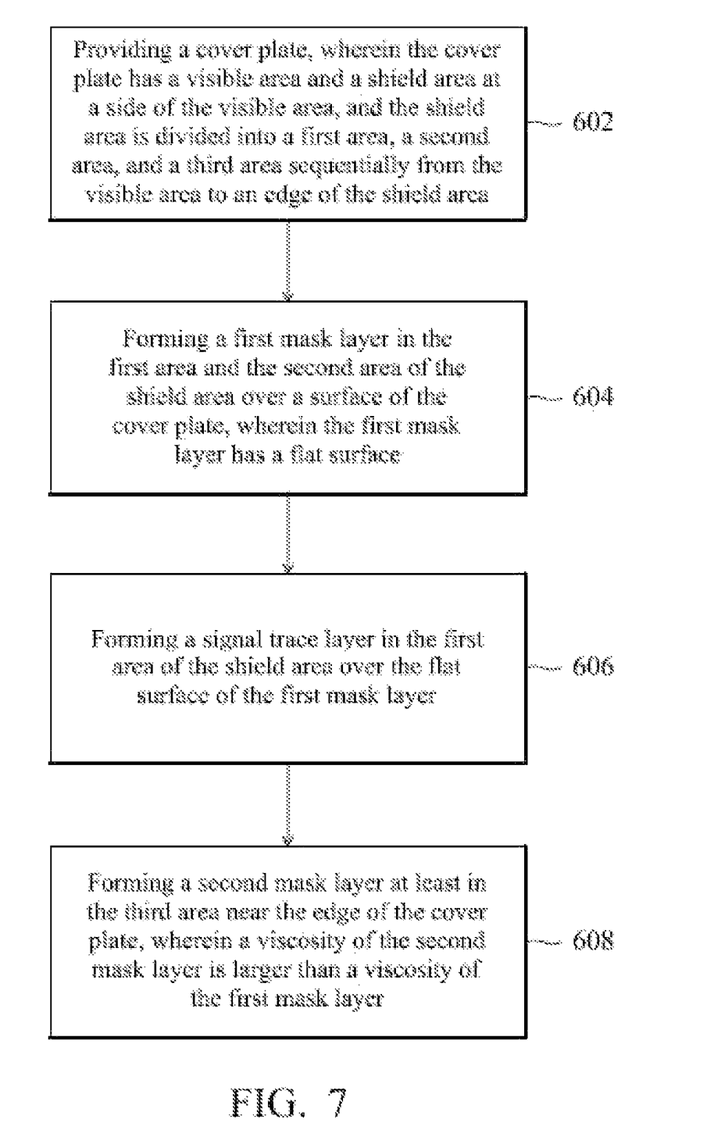
FIG. 7 illustrates a flow chart of a method for manufacturing a touch panel device in accordance with some embodiments.

FIG. 7 illustrates a flow chart of a method for manufacturing a touch panel device in accordance with some embodiments. FIGS. 8 to 12 illustrate cross-sectional representations or top view representations of various stages of forming a touch panel device by the method shown in FIG. 7 in accordance with some embodiments. Referring to FIG. 7, in step 602, a cover plate is provided. The cover plate has a visible area and a shield area at a side of the visible area. The shield area is divided into a first area, a second area, and a third area sequentially from the visible area to an edge of the shield area. In step 604, a first mask layer is formed in the first area and the second area of the shield area over a surface of the cover plate. The first mask layer has a flat surface. In step 606, a signal trace layer is formed in the first area of the shield area over the flat surface of the first mask layer. In step 608, a second mask layer is formed in at least the third area near the edge of the cover plate. The viscosity of the second mask layer is greater than the viscosity of the first mask layer.

The method for manufacturing the touch panel device further includes forming a sensing layer to electrically connect with the signal trace layer. The sensing layer is formed on the cover plate and in the visible area of the cover plate. The details of manufacturing the touch panel device will be described below.

Figure 8:
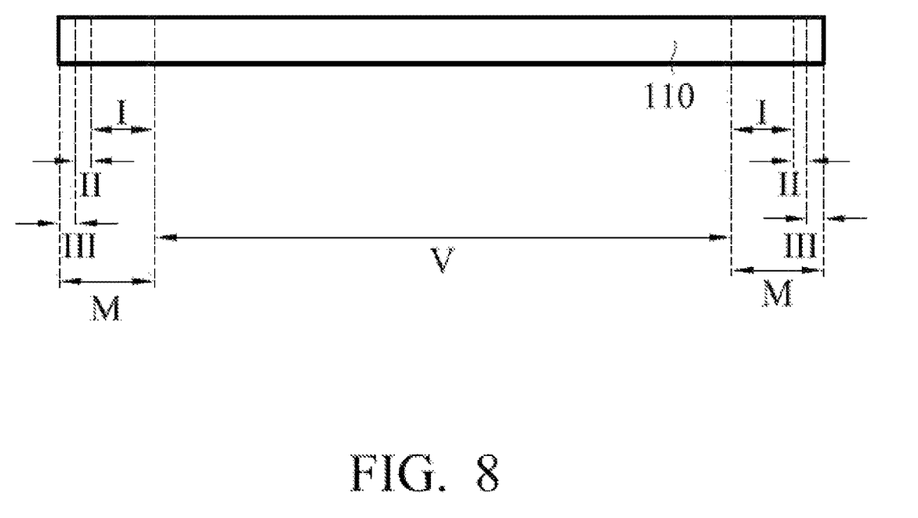
FIGS. 8 to 12 illustrate cross-sectional representations or top view representations of various stages of forming a touch panel device by the method shown in FIG. 7 in accordance with some embodiments.

Referring to FIGS. 7 and 8, in step 602, the cover plate 110 is provided. The cover plate 110 has the visible area V and the shield area M at a side of the visible area V. The shield area M is divided into the first area I, the second area II, and the third area III sequentially from the visible area V to the edge of the shield area M. Referring back to FIG. 2b, the shield area M further surrounds the visible area V, and the first area I of the shield area M surrounds the visible area V. The second area II of the shield area M surrounds the first area I of the shield area M. The third area III of the shield area M surrounds the second area II of the shield area M.

The cover plate 110 may be made of a transparent insulating material, such as glass or poly(ethylene terephthalate) (PET). The cover plate 110 may be a rigid substrate or a flexible substrate. The cover plate 110 may be flat, curved, or a combination thereof. More specifically, the cover plate 110 is a 2.5 D glass or a 3 D glass in accordance with some embodiments.

The width of the second area II may be in a range from 1.5 mm to 3.5 mm. The width of the third area III may be in a range from 0.25 mm to 0.5 mm. However, it should be noted that the widths of the first area I, the second area II, and the third area III may be adjusted depending on their applications, and the scope of the disclosure is not intended to be limiting. In addition, the shapes of the first area I, the second area II, and the third area III are not limited to the shapes shown in FIG. 2.

Figure 9:
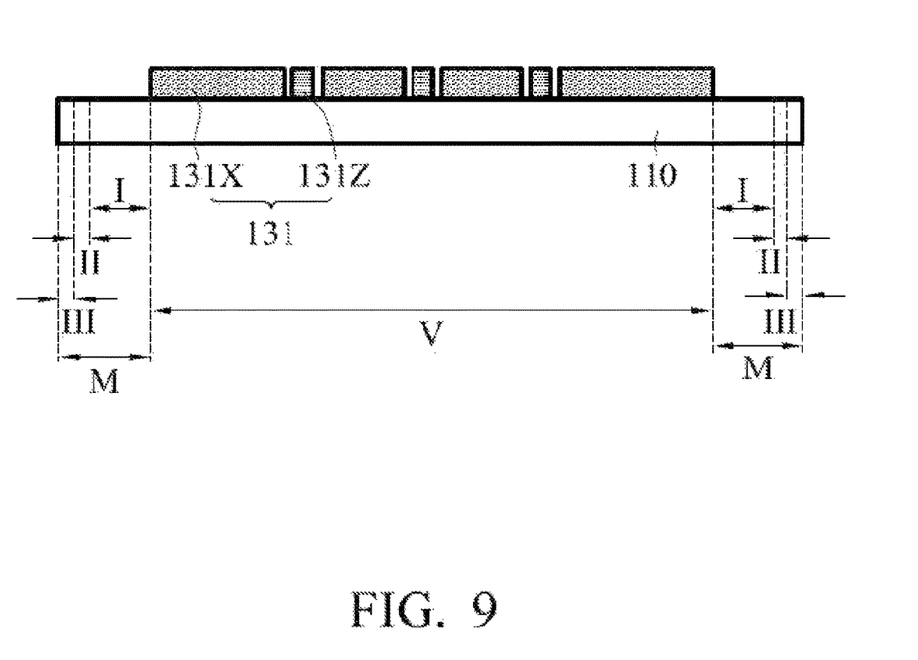

Referring to FIGS. 3, 7, and 9, the electrode portion 131 may be formed in the visible area V of the cover plate 110, after step 602 but before step 604 are performed. The electrode portion 131 may include the plurality of first electrodes 131X aligned in rows, the plurality of second electrodes 131Y aligned in columns, and the plurality of connecting portions 131Z connecting the adjacent second electrodes 131Y. The electrodes portion 131 may be made of a transparent conductive material, such as silver nano-wire, carbon nanotube (CNT), graphene, indium tin oxide (ITO), or aluminium zinc oxide (AZO). The electrode portion 131 may be formed by depositing a transparent conductive material layer and then patterning the transparent conductive material layer by photolithography and etching processes. The transparent conductive material layer may be deposited by sputtering, or other known depositing processes. In one embodiment, the electrode portion 131 is made of ITO formed at 300° C. and 350° C.

Figure 10:
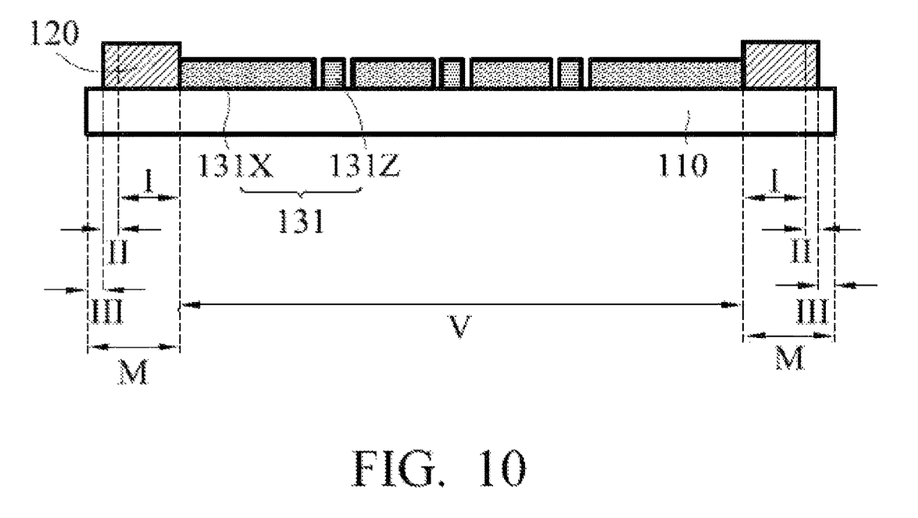

Afterwards, referring to FIG. 10, a first mask layer 120 is formed in the first area I and the second area II of the shield area M in step 604. In addition, the first mask layer 120 in the second area II has a morphing pattern (not shown in FIG. 10, referring to FIGS. 4a to 4g). In some embodiments, the morphing pattern includes a plurality of identical or different shapes, symbols, letters, numbers, or combinations thereof. In some embodiments, the morphing pattern includes a plurality of holes aligned in an array. In some embodiments, the morphing pattern includes a plurality of triangles, quadrangles, circles, or combinations thereof. The first mask layer 120 may be made of a color photoresist material which includes a resin, a dye, a light sensing agent, and a solvent. The viscosity of the photoresist material may be less than 150 cps. For example, the viscosity of the photoresist material may be in a range from 3 cps to 50 cps, or in a range from 60 cps to 100 cps. In a preferred embodiment, the first mask layer 120 is made of a black photoresist material having a viscosity in a range from 3 cps to 50 cps. The morphing pattern of the first mask layer 120 may be formed by performing processes such as lithography, etching, or other patterning processes developed in the future.

Figure 11:
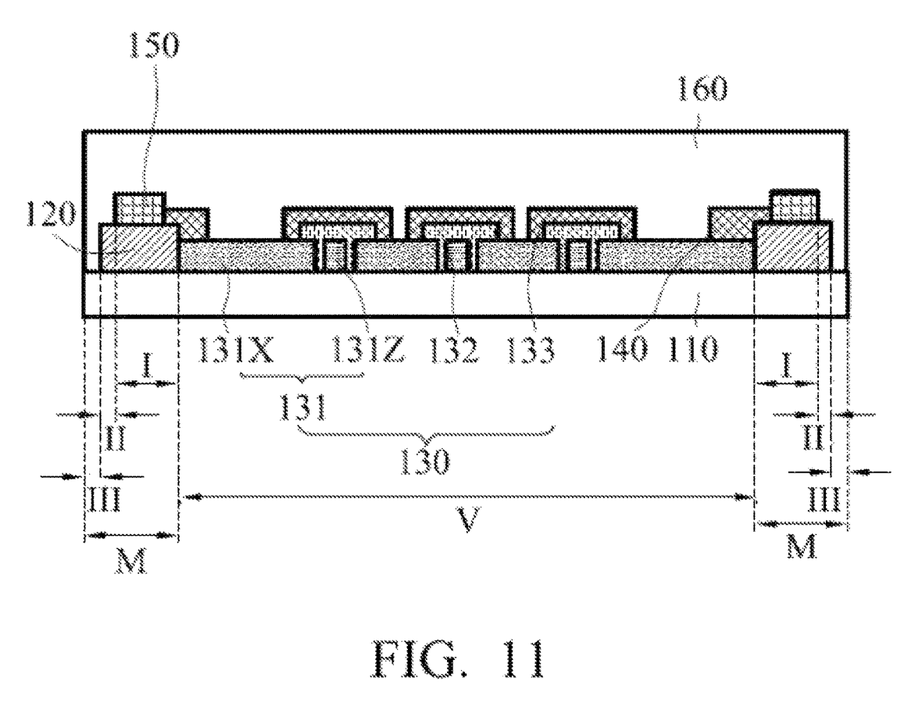

Referring to FIG. 11, after step 604 but before step 606 are performed, the insulating portions 132 are formed over the connection portions 131Z of the electrode portion 131. The insulating portions 132 may be made of an insulating material such as a photoresist. In addition, the insulating portions 132 may be formed by performing a photolithography process or a printing process to an insulating layer. In one embodiment, the insulating portions 132 are made of an organic or an inorganic insulating material, such as polyimide or epoxy resin.

Next, the cross-linking portions 133 are formed over the insulating portions 132. Meanwhile, the conductive portions 140 may also be formed on the first mask layer 120 to electrically connect with the sensing layer 130. The cross-linking portions 133 may be made of a metallic material, a transparent conductive material, or a combination thereof. The metallic material may be silver or gold. The transparent material may be ITO. Preferably, the conductive portions 140 and the cross-linking portions 133 are formed by the same transparent conductive material, such as ITO. Accordingly, the signal trace layer 150 will not directly connect to the sensing layer 130 and therefore will not be seen even if the signal trace layer 150 is made of a metal. The cross-linking portions 133 and the conductive portions 140 may be formed by lithography and etching processes or a printing process.

In one embodiment, the electrode portion 131 is made of ITO formed under 300° C. to 350° C., and the cross-linking portions 132A are made of ITO formed under 20° C. to 30° C. However, the electrode portion 131 and the cross-linking portions 132A may be made of other materials, and the scope of the disclosure is not intended to be limiting. The ITO formed at high temperature and the ITO formed at low temperature are patterned by different etchants during the photolithography processes. Therefore, the electrode portion 131 will not be damaged during the formation of the cross-linking portions 133 and conductive portions 140. The formation of the sensing layer 130 and other elements have been described previously and are not repeated herein.

In another embodiment, the sensing layer has a structure similar to that in FIG. 6. In addition, the electrode portion 531 is made of ITO formed under 20° C. to 30° C., and the cross-linking portions 533 are made of ITO formed under 300° C. to 350° C. Preferably, the conductive portions 540 are also made of ITO and are formed at the same time as the electrode portion 531 is formed.

Referring to FIG. 11, in step 606, the signal trace layer 150 is formed over the first mask layer 120. The signal trace layer 150 is electrically connected to electrode portions by conductive portions 140. In another embodiment, the conductive portions are not formed, and the signal trace layer 150 is directly electrically connected to electrode portion 131. The signal trace layer 150 may be made of metallic materials such as silver or aluminum, transparent conductive materials such as ITO, or a combination thereof. Preferably, the signal trace layer 150 is made of a metallic material, which has a better electrical conductivity. The signal trace layer 150 may be formed by lithography and etching processes or a printing process. In another preferred embodiment, the cross-linking portions 133 and the signal trace layer 150 are made of the same material, such as a metallic material, and therefore the cross-linking portions 133 and the signal trace layer 150 can be formed at the same time in step 606.

Figure 12:
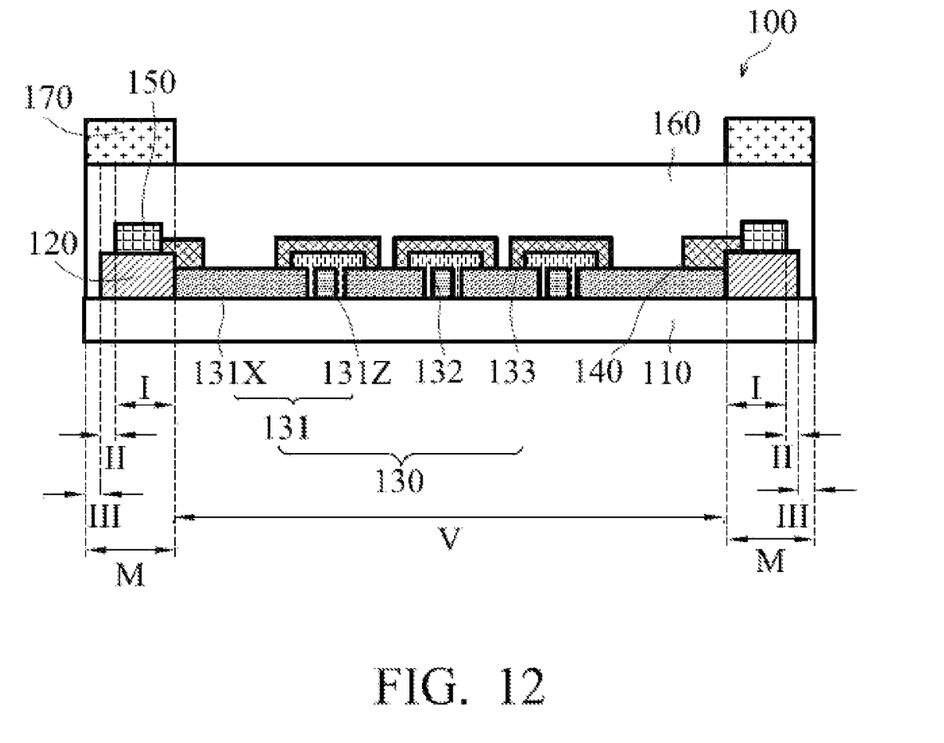

Referring to FIG. 11, the method for forming the touch panel device further includes forming the protection layer 160 after the signal trace layer 150 is formed (i.e. before step 606 but after step 608 are performed). More specifically, referring to FIG. 11, a first side of the protection layer 160 is disposed in the third area III over the cover plate 110. The first side of the protection layer 160 in the second area II is disposed on the flat surface of the first mask layer 120, and the first side of the protection layer 160 in the first area I is disposed on the signal trace layer 150. A second side of the protection layer 160 supports the second mask layer 170 (as shown in FIG. 12) formed in the subsequent processes. The protection layer 160 may be made of transparent insulating materials, such as photoresist or silicon dioxide. In one embodiment, the protection layer 160 is made of a transparent photoresist material having a thickness in a range from 1500 nm to 2000 nm. In another embodiment, the protection layer 160 is made of silicon dioxide having a thickness in a range from 10 nm to 30 nm. The material and thickness of the protection layer 160 may be adjusted depending on the applications and are not intended to be limiting.

Referring to FIG. 12, the second mask layer 170 is formed in at least the third area III near the edge of the cover plate 110, in step 608.

In one embodiment, the second mask layer 170 may only be formed in the third area III close to the edge of the cover plate 110.

In one embodiment, the second mask layer 170 may further be formed in the second area II. That is, the second mask layer 170 is formed in the second area II and the third area III.

In a preferred embodiment, the second mask layer 170 is further disposed in the second area II and the first area I. That is, the second mask layer 170 extends from the first area I of the shield area M to the second area II and the third area III, such that the second mask layer 170 covers the whole shield area M.

In the embodiment described above, the protection layer 160 is formed after the signal trace layer 150 is formed, and the second mask layer 170 is formed after the protection layer 160 is formed. However, in another embodiment, the second mask layer 170 is formed after the signal trace layer 150 is formed, and then the protection layer 160 is formed afterwards. In the embodiment, the second mask layer 170 in the third area III is disposed on the surface of the cover plate 110. In another preferred embodiment, the second mask layer 170 is further disposed in the second area II and the first area I. The second mask layer 170 in the second area II is disposed on the flat surface of the first mask layer 120. The second mask layer 170 in the first area I is disposed on the signal trace layer 150.

In one embodiment, the viscosity of the second mask layer 170 may be different from the viscosity of the first mask layer 120. Preferably, the second mask layer 170 is made of a material with a higher viscosity (e.g. in a range from 3500 cps to 12000 cps, or more specifically, 4000 cps, 6000 cps, or 7500 cps), such that the second mask layer 170 can have a better flatness. In a preferred embodiment, the second mask layer 170 is made of a color ink material (preferably a black ink material) which includes a dye, a linking agent, and an auxiliary agent. The ink material may have a viscosity of over 10000 cps and may be formed by printing. Preferably, the color of the first mask layer 120 is similar to, or the same as, the color of the second mask layer 170.

Generally, a photoresist is coated onto an edge of a cover plate (e.g. glass) to form a touch panel device. However, the photoresist formed on the edge of the plate tends to be too thin, too thick, or uneven due to the physical effect between the liquid photoresist material and the glass. Therefore, in some embodiments, two coating processes are used to prevent the problem described above. In the first coating process, the uneven portion of the first mask layer in the shield area is removed (i.e. the first mask layer with a diminished size), while the flat portion of the first mask layer remains. In addition, the flat surface of the first mask layer (such as a black photoresist layer) includes a morphing area and an ordinary area. Afterwards, a second coating process is performed to coat a second mask layer having a color similar to, or the same as, the color of the first mask layer. The second mask layer (such as a black ink layer) may cover the whole shield area or may cover only a portion of the shield area. Accordingly, the edge of the touch panel device will not be too thin, too thick, or uneven. It should be noted that even though the color of the two coatings may be similar or the same, a color difference may still be observed (similar to the situation that even if the same material is coated twice, a color difference may still be observed due to the coating-time difference). Therefore, in some embodiments, the morphing pattern is formed at the edge of the first mask layer, such that the colors of the first mask layer and the second mask layer are mixed and the color difference becomes difficult to observe by human eyes. In addition, when the color of the first mask layer is different from the color of the second mask layer, the morphing area of the first mask layer may be used to form the touch panel device with composite colors. Therefore, the desire of having various colors and patterns in the touch panel device is fulfilled.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A touch panel device, comprising:
   a cover plate having a visible area and a shield area at a side of the visible area, wherein the shield area is divided into a first area, a second area, and a third area sequentially from the visible area;
   a first mask layer disposed in the first area of the shield area and the second area of the shield area, wherein the first mask layer has a top surface having a first region in the first area of the shield area and a second region in the second area of the shield area, and the second region of the top surface of the first mask layer has a morphing pattern that is different from a pattern of the first region of the top surface of the first mask layer;
   a signal trace layer disposed in the first area of the shield area over on the first region of the top surface of the first mask layer; and
   a second mask layer at least disposed in the third area of the shield area and the second area of the shield area to overlie the morphing pattern, wherein a viscosity of the second mask layer is larger than a viscosity of the first mask layer.

2. The touch panel device as claimed in claim 1, wherein the viscosity of the first mask layer is in a range from 3 cps to 50 cps, and the viscosity of the second mask layer is in a range from 3500 cps to 12000 cps.

3. The touch panel device as claimed in claim 1, wherein the first mask layer is a photoresist layer, and the second mask layer is an ink layer.

4. The touch panel device as claimed in claim 1, wherein a color of the first mask layer is the same as or different from a color of the second mask layer.

5. The touch panel device as claimed in claim 1, wherein a width of the second area of the shield area is in a range from 1.5 mm to 3.5 mm, and a width of the third area of the shield area is in a range from 0.25 mm to 0.5 mm.

6. The touch panel device as claimed in claim 1, wherein the shield area further surrounds the visible area, and the first area of the shield area surrounds the visible area, the second area of the shield area surrounds the first area of the shield area, and the third area of the shield area surrounds the second area of the shield area.

7. The touch panel device as claimed in claim 1, wherein the morphing pattern is disposed at an edge of the first mask layer.

8. The touch panel device as claimed in claim 1, wherein the second mask layer is further disposed in the first area of the shield area, the second mask layer in the third area is disposed on a surface of the cover plate, the second mask layer in the second area is disposed on the top surface of the first mask layer, and the second mask layer in the first area is disposed on the signal trace layer.

9. The touch panel device as claimed in claim 1, further comprising:

a protection layer, wherein a first side of the protection layer in the third area is disposed on a surface of the cover plate, the first side of the protection layer in the second area is disposed on the second region of the surface of the first mask layer, the first side of the protection layer in the first area is disposed on the signal trace layer, and the second mask layer is disposed on a second side of the protection layer.

10. The touch panel device as claimed in claim 1, further comprising:
a sensing layer electrically connected to the signal trace layer, wherein the sensing layer is disposed in the visible area of the cover plate.

11. The touch panel device as claimed in claim 10, wherein the sensing layer comprises:
an electrode portion comprising a plurality of first electrodes aligned in rows, a plurality of second electrodes aligned in columns, and a plurality of connecting portions connecting adjacent second electrodes of the plurality of second electrodes in a same column;
a plurality of cross-linking portions connecting adjacent first electrodes of the plurality of first electrodes in a same row; and
a plurality of insulating portions disposed between the plurality of connecting portions and the plurality of cross-linking portions.

12. The touch panel device as claimed in claim 10, further comprising:
a conductive portion, wherein the conductive portion is configured to electrically connect the sensing layer with the signal trace layer.

13. The touch panel device as claimed in claim 1, wherein the second mask layer is further disposed in the first area of the shield area and overlies the signal trace layer.

14. The touch panel device as claimed in claim 1, wherein the morphing pattern comprises symbols, letters, numbers, combinations of the symbols, the letters and the numbers, a plurality of holes aligned in an array, triangles, quadrangles, circles, or combinations of the triangles, the quadrangles, and the circles.

15. The touch panel device as claimed in claim 1, wherein the top surface is a flat surface, or a curve and smooth surface.

16. A method for manufacturing a touch panel device, comprising:
providing a cover plate, wherein the cover plate has a visible area and a shield area at a side of the visible area, and the shield area is divided into a first area, a second area, and a third area sequentially from the visible area;
forming a first mask layer in the first area of the shield area and the second area of the shield area, wherein the first mask layer has a top surface having a first region in the first area of the shield area and a second region in the second area of the shield area, and the second region of the top surface of the first mask layer has a morphing pattern that is different from a pattern of the first region of the top surface of the first mask layer;
forming a signal trace layer in the first area of the shield area on the first region of the top surface of the first mask layer; and
forming a second mask layer at least in the third area of the shield area and the second area of the shield area to overlie the morphing pattern, wherein a viscosity of the second mask layer is larger than a viscosity of the first mask layer.

17. The method for manufacturing the touch panel device as claimed in claim 16, wherein the morphing pattern is disposed at an edge of the first mask layer.

18. The method for manufacturing a touch panel device as claimed in claim 16, wherein the second mask layer is formed after the signal trace layer is formed, the second mask layer is further formed in the first area of the shield area, the second mask layer in the third area is formed on a surface of the cover plate, the second mask layer in the second area is formed on the top surface of the first mask layer, and the second mask layer in the first area is formed on the signal trace layer.

19. The method for manufacturing a touch panel device as claimed in claim 16, further comprising:
forming a protection layer after the signal trace layer is formed, wherein the second mask layer is formed after the protection layer is formed, the protection layer in the third area is formed on a surface of the cover plate, the protection layer in the second area is formed on the second region of the top surface of the first mask layer, and the protection layer in the first area is formed on the signal trace layer.

20. The method for manufacturing a touch panel device as claimed in claim 16, further comprising:
forming a sensing layer electrically connected to the signal trace layer, wherein the sensing layer is formed in the visible area of the cover plate.

* * * * *

UNITED STATES PATENT AND TRADEMARK OFFICE
CERTIFICATE OF CORRECTION

PATENT NO.       : 9,600,105 B2
APPLICATION NO.  : 14/181715
DATED            : March 21, 2017
INVENTOR(S)      : Yuh-Wen Lee et al.

Page 1 of 1

It is certified that error appears in the above-identified patent and that said Letters Patent is hereby corrected as shown below:

In the Claims

Column 12, Line 29, please delete the word "over"

Signed and Sealed this
Thirtieth Day of May, 2017

Michelle K. Lee
*Director of the United States Patent and Trademark Office*